(12) United States Patent
Ekl et al.

(10) Patent No.: US 11,696,108 B2
(45) Date of Patent: *Jul. 4, 2023

(54) EMERGENCY CALL DATA AGGREGATION AND VISUALIZATION

(71) Applicant: RapidDeploy, Inc., Austin, TX (US)

(72) Inventors: Reinhard Ekl, Austin, TX (US); Brooks Thomas Shannon, Austin, TX (US)

(73) Assignee: RapidDeploy, Inc., Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/475,840

(22) Filed: Sep. 15, 2021

(65) Prior Publication Data

US 2022/0007165 A1 Jan. 6, 2022

Related U.S. Application Data

(63) Continuation of application No. 17/116,056, filed on Dec. 9, 2020, now Pat. No. 11,153,742.

(60) Provisional application No. 63/002,672, filed on Mar. 31, 2020.

(51) Int. Cl.
*H04W 4/90* (2018.01)
*H04W 76/50* (2018.01)
*H04M 3/51* (2006.01)
*H04W 4/029* (2018.01)

(52) U.S. Cl.
CPC ........... *H04W 4/90* (2018.02); *H04M 3/5116* (2013.01); *H04W 4/029* (2018.02); *H04W 76/50* (2018.02)

(58) Field of Classification Search
None
See application file for complete search history.

(56) References Cited

U.S. PATENT DOCUMENTS

| 10,008,103 | B1 | 6/2018 | Hamilton |
| 10,313,865 | B1* | 6/2019 | Patton .................... G10L 15/26 |
| 2012/0027189 | A1* | 2/2012 | Shaffer ............. H04M 3/42348 |
| | | | 379/142.1 |
| 2015/0085997 | A1 | 3/2015 | Biage et al. |
| 2020/0288295 | A1 | 9/2020 | Martin et al. |

(Continued)

OTHER PUBLICATIONS

International Search Report and Written Opinion issued in PCT Application No. PCT/US2021/024775 dated Apr. 16, 2021; 7 pages.

(Continued)

*Primary Examiner* — German Viana Di Prisco
(74) *Attorney, Agent, or Firm* — Patent Capital Group

(57) ABSTRACT

A system for providing locations of emergency callers receives call data related to emergency calls received at a public safety answering point (PSAP) and a supplemental data signal that includes a location of an emergency. A signal correlation engine determines whether the supplemental data signal corresponds to one of the emergency calls received at the PSAP. A web server provides a user interface that includes a map and a supplemental signal indicator corresponding to the supplemental data signal. The supplemental signal indicator is positioned on the map at the location of the emergency, and the supplemental signal indicator has a visual characteristic indicating whether or not the supplemental data signal corresponds to an emergency call received at the PSAP.

20 Claims, 11 Drawing Sheets

(56) References Cited

U.S. PATENT DOCUMENTS

2020/0314240 A1\* 10/2020 Leavitt ................ H04M 3/5133
2020/0314623 A1 10/2020 Pellegrini et al.

OTHER PUBLICATIONS

USPTO Nonfinal Rejection issued in U.S. Appl. No. 17/116,056 dated Feb. 26, 2021; 17 pages.

\* cited by examiner

EMERGENCY CALL DATA AGGREGATION AND VISUALIZATION

CROSS REFERENCE TO RELATED APPLICATIONS

This application is a continuation of U.S. application Ser. No. 17/116,056, filed Dec. 9, 2020, which claims the benefit of and priority to U.S. Provisional Application No. 63/002,672, filed Mar. 31, 2020, the disclosures of which are hereby incorporated by reference herein in their entireties for all purposes.

BACKGROUND

Public Safety Answering Points (PSAPs) receive emergency calls from the legacy time division multiplexing (TDM)-based Selective Router (SR) network and NG9-1-1 Emergency Services IP Network (ESInet). These calls terminate to 9-1-1 Customer Premises Equipment (CPE) systems or other call handling systems within the PSAPs, and the call handling systems distribute the calls to telecommunicators. CPE systems provide telemetry information for incoming emergency calls, such as various forms of emergency caller location information, call routing actions, Automatic Call Distribution (ACD) events, etc. CPE systems traditionally interface with on-site call taking and computer-aided dispatch (CAD) applications, which operate on servers in the PSAP and connect directly to the CPE system over the local network of the PSAP. After an emergency call has been routed to a particular telecommunicator in the PSAP, the CAD application running on the telecommunicator's workstation displays the call data associated with the emergency call to the telecommunicator.

DESCRIPTION OF EXAMPLE EMBODIMENTS OF THE DISCLOSURE

Overview

Figure 1:
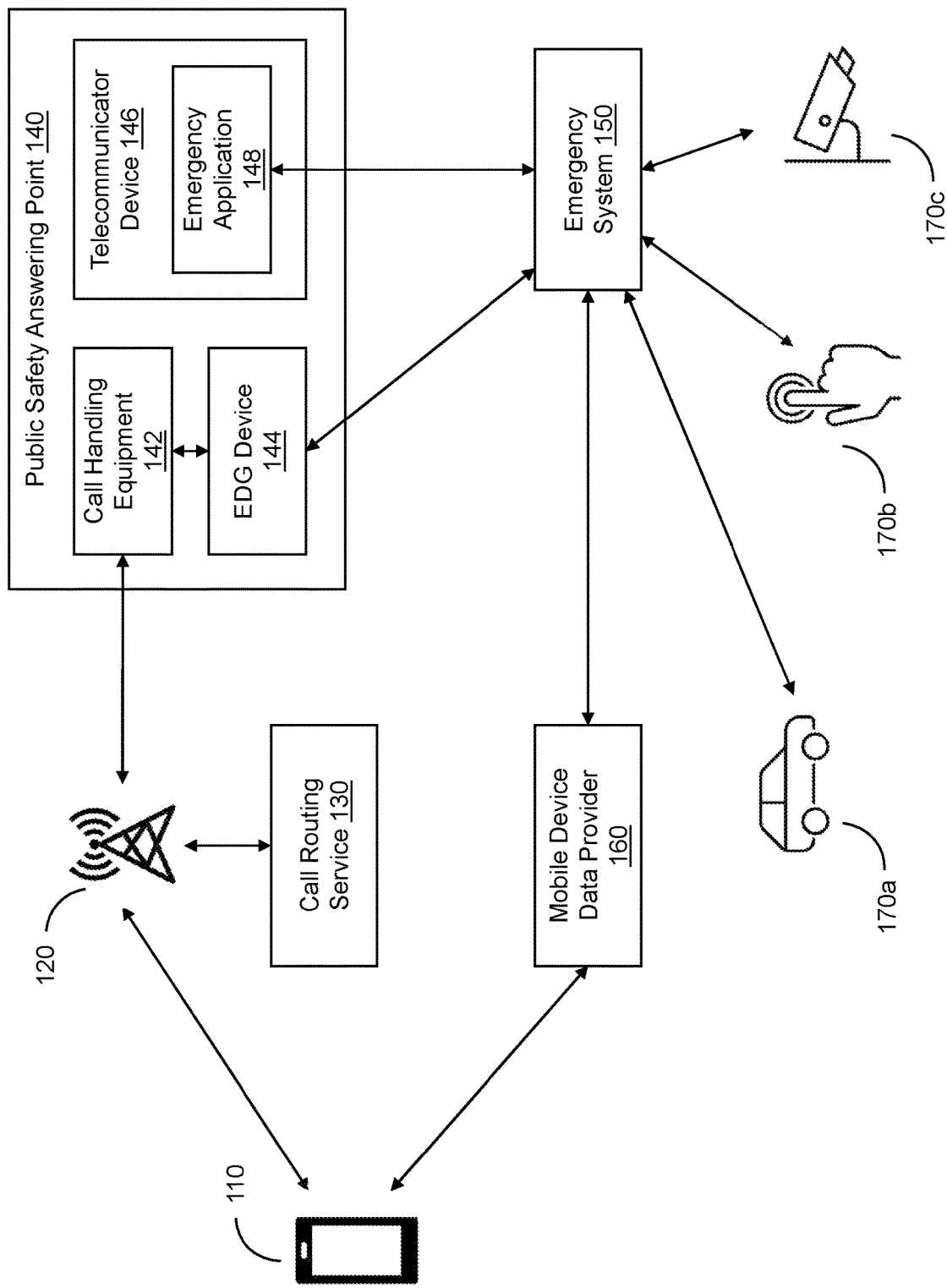
FIG. 1 is a system diagram illustrating an environment of a system for handling and displaying data associated with emergency calls according to some embodiments of the present disclosure.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

Traditional on-premise CAD implementations only have access to telemetry information for calls that have been routed to the PSAP and answered by a telecommunicator. On-premise CADs do not receive information about emergency calls that were routed to another PSAP (e.g., calls routed to a highway patrol that were made from a highway within the jurisdictional boundary of the PSAP, or calls routed based on inaccurate initial location information) and calls not delivered to the PSAP due to network outages, routing errors, or caller hang-ups, for example. Furthermore, previous CAD workflows typically display call data only after the calls have been assigned to a telecommunicator, which delays the display of information. In addition, typical CAD programs typically only display a call's location to the telecommunicator handling the call. The typical workflows and data availability leave telecommunicators unaware of nearby or unanswered emergency calls, and reduces telecommunicators' overall awareness about emergencies in their regions.

Supplemental location providers can access the location of phones from which 9-1-1 calls were made and provide displays showing the locations of emergency callers. This additional data can provide better environmental awareness to telecommunicators than on-premise CADs. However, the supplemental location information is not integrated into existing on-premise CAD user interfaces. Instead, the supplemental location information from the supplemental location provider is displayed on a separate interface from the telemetry data from the CPE displayed in the CAD, and the supplemental locations cannot be linked to the call information managed by the on-premise CAD system. Requiring telecommunicators to load and interpret an additional user interface to view supplemental location information limits the usefulness of the supplemental location information for telecommunicators, who must manage a large amount of information in real time to assist emergency callers.

To provide a unified interface with both telemetry information received with the calls and supplemental information from one or more supplemental location providers, an emergency system aggregates and correlates data from on-premise and supplemental data sources. The emergency system ingests call data from one or more PSAPs. The call data describes emergency calls routed to the PSAPs for handling by telecommunicators in the PSAPs. The call data may include the locations of 9-1-1 calls, call routing information (e.g., which PSAP the call has been routed to), and call status information (e.g., the position of the telecommunicator handling the call). To obtain the call data, the emergency system may include or interact with on-site integrations with call handling equipment (CHE), including on-site CHE located at PSAPs, or other call handling systems, such as regional call handling hosts that distribute calls to a set of PSAPs across a region. The emergency system also receives additional information about emergency callers from one or more supplemental data providers. For example, the emergency system receives device-derived locations and callback numbers of emergency calls from a mobile device provider. The emergency system matches and aggregates the available information it receives from various data sources for given emergency call (e.g., call data from a CHE and a supplemental location from a supplemental data provider) based on common data (e.g., a phone number of the mobile device that made the emergency call).

The emergency system provides a user interface that displays the aggregated call information, such as a CAD interface or an emergency call mapping interface. For example, the emergency system generates a map that shows all emergency calls within a PSAP's jurisdiction, including calls being handled by telecommunicators at the PSAP, calls that are queued for the PSAP's telecommunicators, and calls that are being handled by other agencies but fall within the PSAP's jurisdiction. The user interface provided by the emergency system may visually distinguish different types of calls, e.g., calls that have been answered, calls that have not been answered, calls that have not been answered for a threshold amount of time, etc. This interface provides telecommunicators greater insight into emergencies in their jurisdiction and how the emergency calls are being handled.

In one aspect, a system for providing locations of emergency callers includes processing circuitry and a memory. The system includes a call data ingestion module, a supplemental data ingestion module, a signal correlation engine, and a web server. The call data ingestion module is configured to receive call data related to emergency calls received at a PSAP. The supplemental data ingestion module is configured to receive a supplemental data signal comprising a location of an emergency. The supplemental data signal is provided by a supplemental data source separate from a source of the call data. The signal correlation engine is configured to determine whether the supplemental data signal corresponds to one of the emergency calls received at the PSAP. The web server is configured to provide a user interface that includes a map and a supplemental signal indicator corresponding to the supplemental data signal. The supplemental signal indicator is positioned on the map at the location of the emergency, and the supplemental signal indicator has a visual characteristic indicating whether or not the supplemental data signal corresponds to an emergency call received at the PSAP.

In another aspect, a method for providing a location of an emergency caller includes receiving call data related to emergency calls received at a PSAP; receiving a supplemental data signal comprising a location of an emergency, the supplemental data signal provided by a supplemental data source separate from a source of the call data; determining whether the supplemental data signal corresponds to one of the emergency calls received at the PSAP; and providing a user interface comprising a map and a supplemental signal indicator corresponding to the supplemental data signal, the supplemental signal indicator positioned on the map at the location of the emergency, and the supplemental signal indicator having a visual characteristic indicating whether or not the supplemental data signal corresponds to an emergency call received at the PSAP. In some aspects, the method for providing a location of an emergency caller is embodied on a non-transitory computer-readable storage medium.

As will be appreciated by one skilled in the art, aspects of the present disclosure, in particular aspects of emergency data handling, aggregation, and display, described herein, may be embodied in various manners—e.g. as a method, a system, a computer program product, or a computer-readable storage medium. Accordingly, aspects of the present disclosure may take the form of an entirely hardware embodiment, an entirely software embodiment (including firmware, resident software, micro-code, circuit designs, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems or be stored upon manufacturing of these devices and systems.

In the following detailed description, various aspects of the illustrative implementations may be described using terms commonly employed by those skilled in the art to convey the substance of their work to others skilled in the art. For example, the term "connected" means a direct electrical or magnetic connection between the things that are connected, without any intermediary devices, while the term "coupled" means either a direct electrical or magnetic connection between the things that are connected, or an indirect connection through one or more passive or active intermediary devices. The term "circuit" means one or more passive and/or active components that are arranged to cooperate with one another to provide a desired function. The terms "substantially," "close," "approximately," "near," and "about," generally refer to being within +/−20%, preferably within +/−10%, of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

The terms such as "over," "under," "between," and "on" as used herein refer to a relative position of one material layer or component with respect to other layers or components. For example, one layer disposed over or under another layer may be directly in contact with the other layer or may have one or more intervening layers. Moreover, one layer disposed between two layers may be directly in contact with one or both of the two layers or may have one or more intervening layers. In contrast, a first layer described to be "on" a second layer refers to a layer that is in direct contact with that second layer. Similarly, unless explicitly stated otherwise, one feature disposed between two features may be in direct contact with the adjacent features or may have one or more intervening layers.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. As used herein, the notation "A/B/C" means (A), (B), and/or (C).

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The disclosure may use perspective-based descriptions such as "above," "below," "top," "bottom," and "side"; such descriptions are used to facilitate the discussion and are not intended to restrict the application of disclosed embodiments. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, reference is made to the accompanying drawings that form a part hereof, showing, by way of illustration, some of the embodiments that may be practiced. In the drawings, same reference numerals refer to the same or analogous elements/materials so that, unless stated otherwise, explanations of an element/material with a given reference numeral provided in context of one of the drawings are applicable to other drawings where elements/materials with the same reference numerals may be illustrated. For convenience, if a collection of drawings designated with different letters are present, e.g., FIGS. 2A-2C, such a collection may be referred to herein without the letters, e.g., as "FIG. 2." The accompanying drawings are not necessarily drawn to scale. Moreover, it will be understood that certain embodiments can include more elements than illustrated in a drawing, certain embodiments can include a subset of the elements illustrated in a drawing, and certain embodiments can incorporate any suitable combination of features from two or more drawings.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

In some examples provided herein, interaction may be described in terms of two, three, four, or more electrical components. However, this has been done for purposes of clarity and example only. It should be appreciated that the devices and systems described herein can be consolidated in any suitable manner. Along similar design alternatives, any of the illustrated components, modules, and elements of the accompanying drawings may be combined in various possible configurations, all of which are clearly within the broad scope of the present disclosure. In certain cases, it may be easier to describe one or more of the functionalities of a given set of flows by only referencing a limited number of electrical elements.

The following detailed description presents various descriptions of specific certain embodiments. However, is to be understood that other embodiments may be utilized, and structural or logical changes may be made without departing from the scope of the present disclosure. In general, the innovations described herein can be embodied in a multitude of different ways, for example, as defined and covered by the claims and/or select examples, and the following detailed description is not to be taken in a limiting sense.

Example Emergency Call Data Environment

FIG. 1 is a system diagram illustrating an environment of a system for handling and displaying data associated with emergency calls according to some embodiments of the present disclosure. The system includes a mobile device 110, a cell tower 120, a call routing service 130, a public safety answering point (PSAP) 140, an emergency system 150, a mobile device data provider 160, and secondary data sources 170a-170c. Only one of the mobile device 110, cell tower, call routing service 130, PSAP 140, and mobile device data provider 160 are shown for simplicity; it should be understood that in a working system environment, there may be more of each of these elements.

The mobile device 110 may be a cell phone, a smart phone, a tablet, or another device capable of initiating emergency reporting. The mobile device 110 is a device having a user interface (e.g., a touchscreen, buttons, microphone, speaker, camera, etc.) for interacting with a user and wireless communications circuitry that connects the mobile device 110 to a mobile network to initiate an emergency communication, e.g., to place an emergency call or send a text message. In this example, the mobile device 110 connects to a cellular network via the cell tower 120. In other examples, the mobile device 110 may additionally or alternatively connect to an Internet-based network via a wired or wireless connection (e.g., Wi-Fi), or to one or more other types of networks.

The cell tower 120 is one component of a cellular network that enables wireless communication between mobile devices, and enables communication between wireless devices (e.g., the mobile device 110) and other networked communications devices or systems (e.g., the PSAP 140). Additional cell towers and other networking equipment are directly or indirectly coupled to the cell tower 120 for routing calls placed by mobile devices 110. When a user of the mobile device 110 makes an emergency call, such as a 9-1-1 call, the cell tower 120, or a network element coupled to the cell tower 120, interacts with a call routing service 130. The call routing service 130 determines an initial location estimate of the mobile device 110 based on the location of the cell tower 120. In some examples, the call routing service 130 may determine the location of the mobile device 110 based on alternative or additional information, such as the location of one or more additional cell towers in range of the mobile device 110, or a location provided by the mobile device 110.

The call routing service 130 routes the emergency call from the mobile device 110 to a particular PSAP 140 based on the initial location estimate. The PSAP 140 may cover a particular geographic region, e.g., a city, a county, a group of counties, a highway system, a park system, etc. The call routing service 130 identifies a PSAP (e.g., PSAP 140) that covers the location estimate of the mobile device 110 by comparing the location estimate of the mobile device 110 to the geographic boundaries associated with a set of PSAPs. The mobile device 110 communicates with telephony equipment in the selected PSAP 140 via the cell tower 120 and additional networking equipment not shown in FIG. 1.

The PSAP 140 is an emergency call handling system. The PSAP 140 includes call handling equipment (CHE) 142, an emergency data gateway (EDG) device 144, and a telecommunicator device 146 executing an emergency application 148. The CHE 142 receives and handles calls from the telephony network, which includes the cell tower 120. The CHE 142 creates a call event for each received call, such as an emergency call from mobile device 110. The CHE 142 associates call data, such as caller location information, call routing actions, Automatic Call Distribution (ACD) events, and other telemetry data, with the call event. Call data may also include the phone number and contact name of the user of the mobile device 110, class of service, mobile service provider, a time stamp, and other information describing the user, mobile device 110, network, etc. The CHE 142 may output call data in one of a variety of data output formats, such as Automatic Location Information (ALI), Call Detail Record (CDR), or National Emergency Number Association (NENA) i3 Logging.

In the example shown in FIG. 1, an EDG device 144 installed at the PSAP 140 connects to the CHE 142. The EDG device 144 receives the call data from the CHE 142 and parses and formats the call data into a consistent data format. The EDG device 144 connects to an emergency system 150 via a network, such as the Internet, and the EDG device 144 transmits the formatted call data to the emergency system 150 via the network. The use of an EDG device 144 to transfer data from a CHE 142 to a cloud-based emergency system 150 is described in U.S. Pat. No. 10,264,122, incorporated by reference in its entirety. In another example, a central CPE host located outside the PSAP 140 receives call information for a group of PSAPs and distributes the call information to a selected PSAP, e.g., PSAP 140. In this example, a multi-tenant emergency call data relay may capture call data from the central CPE host and transmit the captured call data to the emergency system 150. The use of the data relay, and the data relay in combination with one or more EDG devices, is described in U.S. patent application Ser. No. 17/070,400, incorporated by reference in its entirety.

The PSAP 140 further includes a telecommunicator device 146. In this example, the telecommunicator device 146 is a computer system operated by a telecommunicator on-site at the PSAP 140. In other embodiments, the telecommunicator device 146 is at a different location from the PSAP 140, e.g., at a backup facility, mobile command center, remote worksite, etc. The telecommunicator device 146 includes the hardware and software needed to display user interfaces, connect to an IP-based network, and detect user input. The telecommunicator device 146 includes an emergency application 148 that allows interaction with the emergency system 150. In one embodiment, the emergency application 148 is a browser that allows a telecommunicator to access a web-based CAD service provided by the emergency system 150. In another embodiment, the emergency application 148 is a dedicated application provided by the emergency system 150 to enable interactions with the emergency system 150. The PSAP 140 may include multiple telecommunicator devices 146, each used by a different telecommunicator. Each telecommunicator device has an associated position number.

The emergency system 150 assists telecommunicators in responding to emergency calls. The emergency system 150 may be a cloud-based processing system embodied on one or more remote servers. While the emergency system 150 is shown as being outside the PSAP 140, in other embodiments, some or all of the functions performed by the emergency system 150 and described herein may alternatively be performed by on-site hardware located within a PSAP 140. Detailed functionality of the emergency system 150 is described with respect to FIG. 2.

The emergency system 150 receives the formatted call data generated by the EDG device 144, processes the received formatted call data, and generates user interfaces for display by the emergency application 148. While one PSAP 140 is shown in FIG. 1, as noted above, the environment may include many similar PSAPs, and the emergency system 150 may receive call data from many PSAPs, e.g., from EDG devices 144 installed across many PSAPs. In addition, the emergency system 150 may receive call data from one or more multi-tenant emergency call data relays at one or more central emergency call handling hosts.

The emergency system 150 also receives supplemental data signals from one or more supplemental data sources. The supplemental data sources are separate from the PSAP 140, and in particular, separate from the CHE 142 and EDG device 144 which provide the call data described above. The supplemental data signals provided by the supplemental data sources include data describing emergencies that reaches the emergency system 150 through one or more alternate pathways. Example supplemental data sources include the mobile device data provider 160 and the secondary data sources 170a-170c shown in FIG. 1. Some or all supplemental data signals may include location information. Some or all supplemental data signals may include contact information, such as a phone number. Some or all supplemental data signals may include alternative or additional data that can be used to correlate the supplemental data signal to an emergency call, such as phone number, name, time stamp, location, etc. Additional and alternative supplemental data that may be included in a supplemental data signal are described below.

The mobile device data provider 160 provides supplemental data signals related to the mobile device 110 making an emergency call. The supplemental data signals may include the location of the mobile device 110, frequent or saved locations of the mobile device 110, identifying information of the mobile device 110 (e.g., telephone number, customer name), a primary language of the customer and/or mobile device 110, medical history information, car crash detection data, a time stamp, and any other information that may be useful to the emergency system 150, a telecommunicator, and/or an emergency responder. In some embodiments, the mobile device data provider 160 automatically transmits the supplemental data signals to the emergency system 150 in response to an emergency call being placed by the mobile device 110. In some embodiments, the mobile device data provider 160 transmits the supplemental data signals in response to a query from the emergency system 150.

The mobile device data provider 160 may be a web server associated with a mobile device provider. For example, the mobile device data provider 160 is operated by a mobile phone company that programs the mobile device 110 to transmit its location to the mobile device data provider 160 when a user of the mobile device 110 initiates an emergency communication (e.g., when the user places an emergency call or sends an emergency text message). As another example, a mobile device data provider 160 is operated by a software provider whose software executes on the mobile device 110 and accesses the user device's location. In still another example, the mobile device data provider 160 is implemented by the mobile device itself 110, e.g., as a software module of the mobile device 110. In this example, the mobile device 110 is programmed (e.g., by a mobile device provider or software provider) to transmits its location and/or other supplemental data directly to the emergency system 150 in response to the user initiating an emergency communication. The system environment may include multiple mobile device data providers 160 associated with different mobile device providers and/or different software providers.

During an emergency call, the mobile device data provider 160 retrieves real-time location information from the mobile device 110 and transmits the location of the mobile device 110 to the emergency system 150 in a supplemental data signal. The mobile device 110 may determine its location based on, for example, GPS signals, WiFi signals, Bluetooth signals, cell towers, or other signals, or a combination of signals. The device-derived locations included in the supplemental data signals are typically more accurate and precise than the location provided in the call data, e.g., the locations based on cell phone towers used for routing calls. In addition, due to lags in existing call handling infrastructure, the device-derived locations are also typically available to the emergency system 150 faster than the call data, and faster than the device-derived locations are currently provided to on-site CAD system. Furthermore, the mobile device data provider 160 can continue to provide updated locations throughout an emergency call as the mobile device 110 moves location.

In addition to mobile devices, other secondary data sources 170 provide location data and/or other data about emergencies to the emergency system 150. While the secondary data sources 170 are illustrated as being in communication with the emergency system 150, data from the secondary data sources 170 may be transmitted from the secondary data sources 170 to the emergency system 150 via additional servers or other communications networks and devices, similar to the mobile device locations being passed to the emergency system 150 by the mobile device data provider 160.

Three example types of secondary data sources are illustrated in FIG. 1. The first example secondary data source 170a represents a vehicle data source. For example, the secondary data source 170a includes a vehicle communication provider that provides the location of the vehicle and vehicle condition information (e.g., whether a crash was detected) to the emergency system 150. A vehicle connected to the vehicle communication provider may alert the vehicle communication provider to an emergency in response to a user action (e.g., a user pressing a button in the vehicle) or automatically (e.g., in response to an automatic crash detection). The second example secondary data source 170b represents a panic button data source that provides the location of a user who pressed a panic button to the emergency system 150. A panic button provider may provide additional information to the emergency system 150 describing the user (e.g., medical history information) and, if available, the type of emergency (e.g., that the user reported a fall or a home invasion). The third example secondary data source 170c is a connected security system that may include one or more of a smart doorbell, a camera, a motion sensor, a fire detector, etc. In response to a user-initiated or automatically detected emergency, a home security service that manages the connected security system may provide an address of the security system, any available real-time video, and other security data (e.g., lock tamper attempts, alarm triggers, etc.) to the emergency system 150. The emergency system 150 may receive additional or alternative secondary data signals from other types of secondary data sources besides those described herein.

The emergency system 150 aggregates supplemental data signals received from the supplemental data sources 160 and 170 and call data received from PSAPs, such as the PSAP 140. For example, for a given call, the emergency system 150 receives call data from the EDG device 144, including the telephone number of the mobile device 110, and a supplemental data signal from the mobile device data provider 160 that includes a real-time location of the mobile device 110. By aggregating call data from the PSAPs and supplemental data signals, the emergency system 150 can provide a more complete picture of the emergencies within the jurisdiction of a given PSAP 140 than prior systems.

The emergency system 150 has access to much more data than a traditional on-premise CAD system. First, the emergency system 150 receives call data from multiple PSAPs. Call data from one PSAP may be relevant to a telecommunicator within a different PSAP, e.g., a neighboring PSAP or a PSAP with overlapping boundaries. For example, an emergency located within a first PSAP's jurisdiction may have been accidentally routed to a second neighboring PSAP, but it would be useful to a telecommunicator in the first PSAP to know about the emergency call.

In addition, the emergency system 150 receives information describing emergencies from one or more supplemental data providers. In some cases, a supplemental data signal regarding a given emergency call may arrive at the emergency system 150 sooner than the call data from a PSAP 140. For example, if a call is queued at the PSAP 140 and has not been assigned to a telecommunicator, the CHE 142 may not output any call data. In this case, the mobile device data provider 160 may provide caller information, including the location of the emergency and a phone number, to the emergency system 150 faster than the CHE 142 outputs the call data.

The emergency system 150 may also receive supplemental data signals describing emergencies for which the PSAP 140 does not receive an emergency call. For example, the mobile device data provider 160 provides locations and callback information for calls that do not get delivered to a PSAP 140 due to network outages or the call being dropped or hung up. As another example, a supplemental data provider provides data describing a mobile device 110 that attempted to text 9-1-1 in a PSAP jurisdiction that does not support Text-to-9-1-1 and does not receive the text. As still another example, a supplemental data provider (e.g., a secondary data provider 170) provides information about car crashes or home burglaries for which an emergency call may not be placed. Based on information received from the supplemental data provider(s), a telecommunicator can begin routing resources to a location before even answering the call. For example, a telecommunicator may begin routing resources in response to seeing a sudden spike in calls for a particular area.

Example Emergency System

Figure 2:
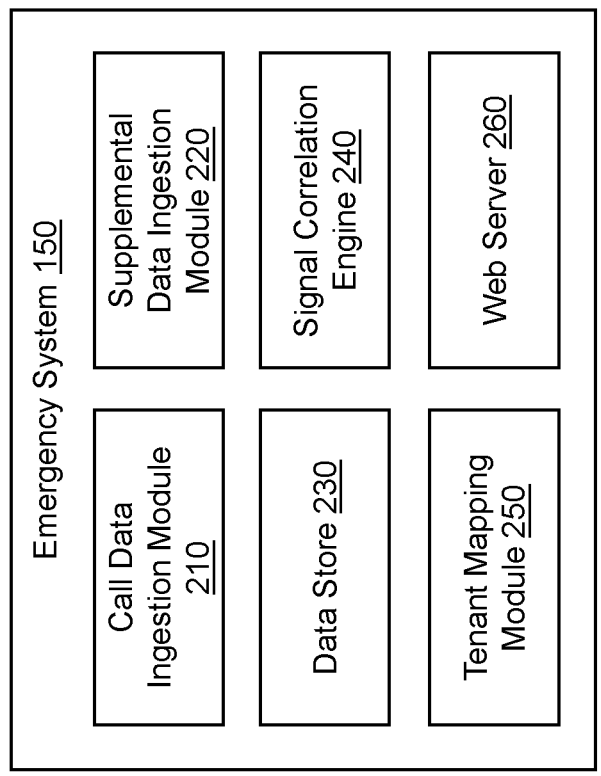
FIG. 2 is a block diagram of the emergency system according to some embodiments of the present disclosure.

FIG. 2 is a block diagram of the emergency system 150 according to some embodiments of the present disclosure. The emergency system 150 includes a call data ingestion module 210, a supplemental data ingestion module 220, data store 230, a signal correlation engine 240, a tenant mapping module 250, and a web server 260. In alternative configurations, different and/or additional components may be included in the emergency system 150. Additionally, functionality described in conjunction with one or more of the components shown in FIG. 2 may be distributed among the components in a different manner than described in conjunction with FIG. 2 in some embodiments.

In one embodiment, the emergency system 150 is a cloud-based computer-aided dispatch (CAD) system that manages a CAD service that provides information about emergency calls and first responders to telecommunicators and enables telecommunicators to connect to first responders and dispatch first responders to the locations of emergencies. The cloud-based CAD system processes call data and supplemental data signals and provides information about an emergency caller to a telecommunicator via the emergency application 150. The cloud-based CAD system may also receive information from the emergency application 148 input by the telecommunicator, e.g., additional information about a caller, selections for responding to the call, information about first responders who were dispatched, etc. In another embodiment, the emergency system 150 is an emergency call mapping interface that provides data about emergencies in a region (e.g., the jurisdiction of a PSAP 140 or a region including the jurisdiction) on a real-time map. In still another embodiment, the emergency system 150 is a call analytics system that performs analysis on received emergency calls based on the call data and supplemental data signals.

The call data ingestion module 210 receives and processes call data related to emergency calls received at PSAPs, e.g., call data received by the EDG device 144 within the PSAP 140 and transmitted to the emergency system 150. The call data ingestion module 210 may receive and process call data from other sources, such as one or more multi-tenant emergency call data relays, which may be used in combination with one or more EDG devices. In some embodiments, the EDG devices are configured to transmit data to the emergency system 150 in a common format. In other embodiments, the call data ingestion module 210 is configured to parse and reformat data received from PSAPs into a common format used by the emergency system 150. The call data ingestion module 210 may determine whether each data message describes a new call or an existing call and associates call data related to the same call. The call data ingestion module 210 outputs call data to the data store 230. In some embodiments, the call data ingestion module 210 also outputs call data to one or more processing modules (e.g., one or more of the modules 240-260) for real-time processing.

The supplemental data ingestion module 220 receives and processes supplemental data signals provided by one or more supplemental data sources separate from the source of the call data, e.g., the supplemental data sources 160 and 170a-170c shown in FIG. 1. At least some of the supplemental data signals may include a location of an emergency. The supplemental data ingestion module 220 may parse supplemental data signals and reformat the parsed supplemental data signal into a common format used by the emergency system 150. The supplemental data ingestion module 220 may determine whether each supplemental data signal is related to a prior supplemental data signal (e.g., an updated location, additional camera footage, etc.) or not, and may associate related supplemental data signals to streamline processing of follow-on data signals. The supplemental data ingestion module 220 outputs supplemental data signals to the data store 230. In some embodiments, the supplemental data ingestion module 220 also outputs supplemental data signals to one or more processing modules (e.g., one or more of the modules 240-260) for real-time processing. The supplemental data ingestion module 220 may have a respective data interface for each supplemental data source of type of supplemental data source, e.g., based on the data format or communication protocol used by the supplemental data source. In some embodiments, each supplemental data source has a respective corresponding data ingestion module, e.g., one data ingestion module for each mobile device data provider, and one data ingestion module for each secondary data source.

The data store 230 provides storage of the call data and supplemental data signals. The data store 230 may be encrypted. In some embodiments, the emergency system 150 includes a first data store for short-term storage (e.g., for ongoing emergency calls), and a second, longer-term data store accessed to perform periodic analyses. On some embodiments, the emergency system 150 includes different data stores for call data and for supplemental data signals. The data store 230 may include one or more of a Binary Large OBject (BLOB) storage service, data warehouse, key-value database, document database, relational database, or any other type of data storage.

The signal correlation engine 240 processes call data and supplemental data signals to determine whether a supplemental data signal corresponds to a particular emergency call received at a PSAP, e.g., PSAP 140. The signal correlation engine 240 may access the call data from the data store 230, or the signal correlation engine 240 may receive new call data directly from the call data ingestion module 210. Similarly, the signal correlation engine 240 may access the supplemental data signals from the data store 230, or the signal correlation engine 240 may receive new supplemental data signals directly from the call data ingestion module 210. The signal correlation engine 240 may compare a caller identifier (e.g., phone number and/or caller name) in a supplemental data signal to caller identifiers in call data related to emergency calls received at one or more PSAPs to determine whether a supplemental data signal corresponds to a particular emergency call. The signal correlation engine 240 may alternatively or additionally use other data fields to correlate a supplemental data signal to call data, such as time stamps, locations, cell carrier, etc. For example, the signal correlation engine 240 may determine that if a supplemental data signal is sufficiently close in location (e.g., within the uncertainty radiuses provided by the location sources) and sufficiently close in time (e.g., within 10 seconds) to the corresponding call data of a given emergency call, the supplemental data signal corresponds to the emergency call. The signal correlation 240 may use various other rules for correlating supplemental data signals to calls. In some embodiments, the rules are user-configurable.

Figure 3:
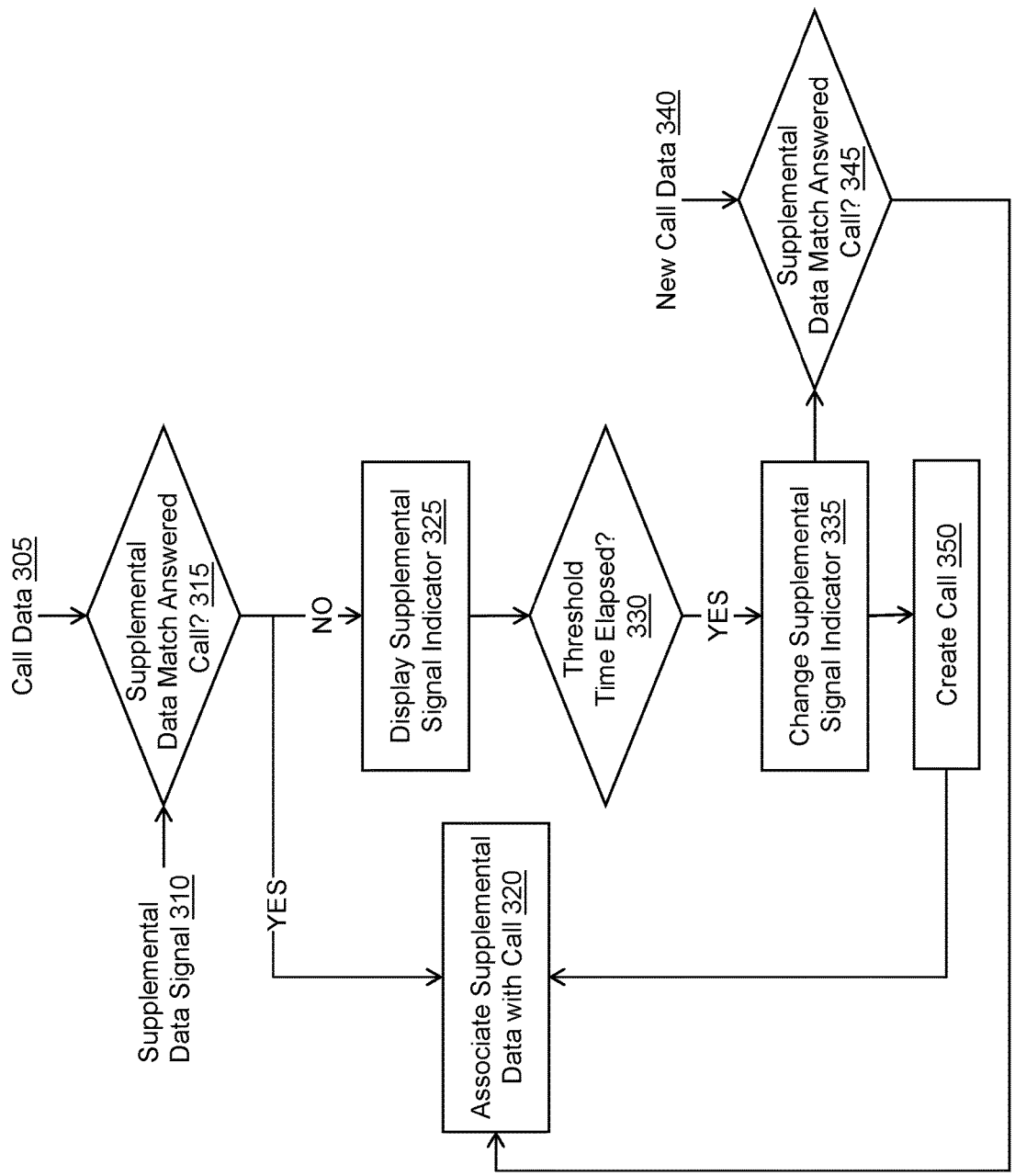
FIG. 3 is a flow diagram illustrating the processing and display of call data and supplemental data according to some embodiments of the present disclosure.

In one embodiment, each time the supplemental data ingestion module 220 receives a supplemental data signal unrelated to a prior supplemental data signal (e.g., a supplemental data signal that is not a follow-on signal from a same device that provided a prior supplemental data signal), the signal correlation engine 240 compares caller identifiers and/or other data fields of the supplemental data signal to corresponding data field(s) of current call data to determine if the supplemental data signal matches an existing call. As the call data ingestion module 210 receives additional call data, the signal correlation engine 240 may continue to compare the supplemental data signal to incoming calls to determine if the supplemental data signal matches calls as their call data arrives at the emergency system 150. FIG. 3 shows a flowchart describing an example signal correlation process performed by the signal correlation engine 240.

The signal correlation engine 240 may utilize one or more filters when attempting to match supplemental data signals to call data to more efficiently correlate supplemental data signals to call data. For example, the signal correlation engine 240 may compare supplemental data signals to call data received during a similar period of time, e.g., within one minute or within five minutes. As another example, the signal correlation engine 240 may perform separate correlation processes for separate geographic regions. The boundaries of the geographic regions may have some overlap to ensure proper correlation for calls near the boundaries of the geographic regions.

Figure 4:
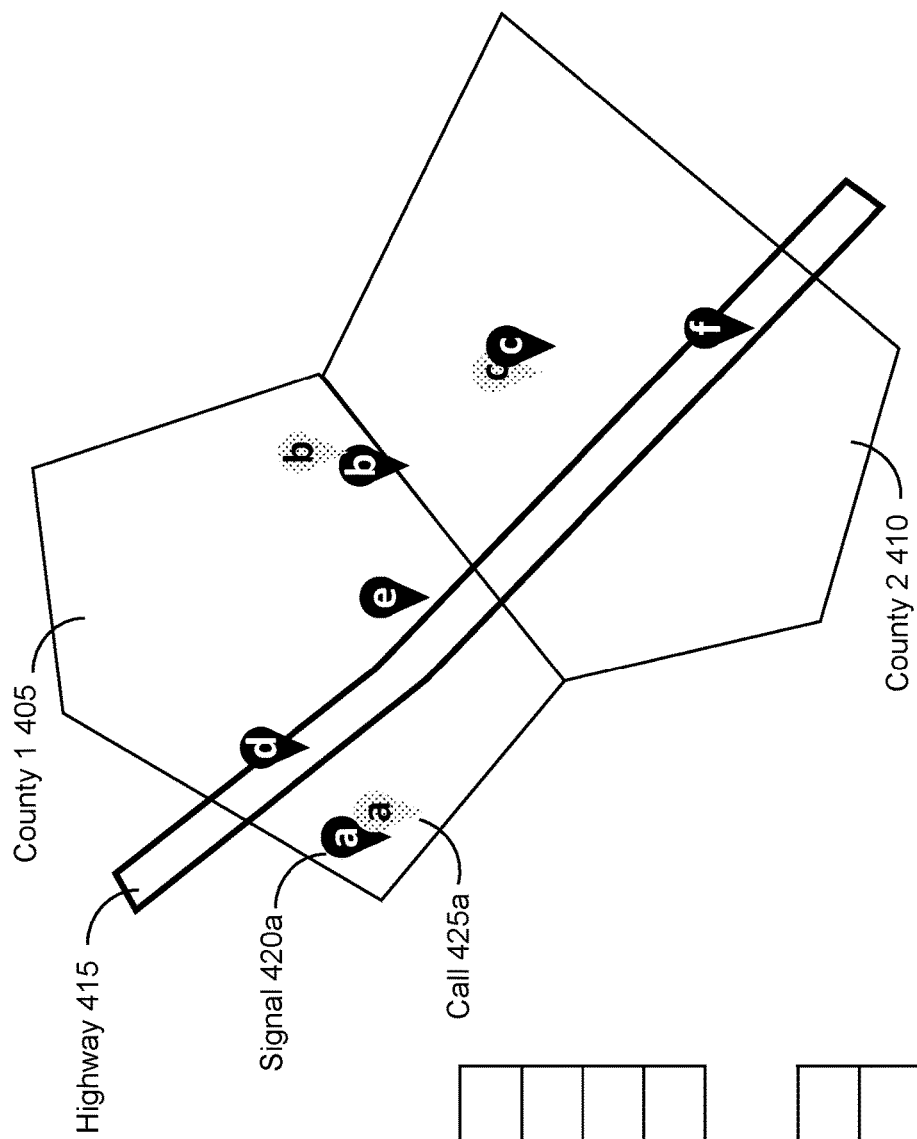
FIG. 4 illustrates the location of calls and signals and mapping of calls and signals to particular tenants according to some embodiments of the present disclosure.

The tenant mapping module 250 maps supplemental data signals to particular PSAPs for which the supplemental data signals are visible. As used herein, a tenant is a subscriber to the emergency system, such as a PSAP. A tenant may also be a group of PSAPs that are assigned to the same jurisdiction and respond to calls within the jurisdiction (e.g., a state highway patrol may include multiple PSAPs that receive calls across the highway system), or other types of emergency or governmental agencies, e.g., a statewide emergency data agency that collects and analyzes emergency data but does not respond to calls. Each tenant has an associated geographic region and may be responsible for responding to emergency calls within that geographic region. The boundaries of the geographic region are represented as a geofence or a set of geofences (referred to generally as "geofence" or "geofence data"). Geofence data may be stored in the tenant mapping module 250, in the data store 230, or in another data store. An example set of geographic boundaries for two regional PSAPs and a highway patrol is shown in FIG. 4. The tenant mapping module 250 compares the locations of supplemental data signals to geofence data for each PSAP to determine whether the supplemental data signals are visible to each PSAP. The tenant mapping module 250 maps a supplemental data signal to a tenant if the location indicated by the supplemental data signal falls within the geofence associated with the tenant. An example of mapped calls and mapped supplemental data signals is shown in FIG. 4. The tenant mapping module 250 outputs the tenant mappings to the web server 260 or to data storage accessed by the web server 260.

The web server 260 provides user interfaces to telecommunicators providing emergency response assistance. A user interface provided by the web server 260 to a telecommunicator in a given PSAP 140 includes a map and one or more supplemental signal indicators corresponding to the supplemental data signals mapped to the PSAP 140. Each supplemental signal indicator is positioned on the map at the location indicated by the supplemental data signal. Each supplemental signal indicator may have a visual characteristic indicating the status of a call corresponding to the supplemental signal indicator. For example, the visual characteristic may indicate whether a corresponding call has been received at the telecommunicator's PSAP, whether a corresponding call has been answered by the telecommunicator, whether a corresponding call has been answered at a different PSAP, and whether a threshold amount of time has elapsed since the call supplemental signal indicator was received without a corresponding call being answered. The web server 260 may provide additional supplemental data via the user interfaces, e.g., pop-up windows or other displays. Example user interfaces provided by the web server 260 are shown in FIGS. 5-11. It should be understood that various user interface functions described herein as being performed by the web server 260 or by the user interface may be performed by the web server 260 (e.g., in a thin client implementation) or at the emergency application 148 based on data and instructions provided to the telecommunicator device 146 by the web server 260 (e.g., in a fat client implementation).

The web server 260 maintains information identifying each telecommunicator accessing the emergency system 150, such as a PSAP identifier and the telecommunicator's position number within the PSAP. For a given telecommunicator, the web server 260 selects data from the data store 230 or one or more other components of the emergency system 150 for display to the telecommunicator. For example, the web server 260 selects call data for calls matching the telecommunicator's PSAP identifier and position number, supplemental data signals related to the selected calls, and supplemental data signals mapped to the PSAP. The user interface may be user-configurable, and the web server 260 may select data for display based on user selections. For example, a user may request to view call data and supplemental data related to all calls currently being handled by a given PSAP, all calls within a given region, a subset of calls handled by the PSAP, data matching a particular search term, etc.

In some embodiments, the call data and supplemental data signals can be used by the emergency system 150 (e.g., a call prioritization module, not shown in FIG. 2) to automatically determine an order for telecommunicators to answer received emergency calls. For example, if the emergency system 150 identifies that multiple calls are coming from same location (e.g., within 1000 feet of each other or another location range), the emergency system 150 may lower the priority of these redundant calls after telecommunicators have already answered a threshold number of calls from that location. As another example, the emergency system 150 may assign calls to telecommunicators based on the call data and/or supplemental data signals, e.g., by assigning calls coming from the same location to the same telecommunicator or the same set of telecommunicators.

Processing and Display of Call Data and Supplemental Data

FIG. 3 is a flow diagram illustrating the processing and display of call data and supplemental data according to some embodiments of the present disclosure. The emergency system 150 (e.g., the call data ingestion module 210) receives call data 305. The emergency system 150 (e.g., the supplemental data ingestion module 220) also receives supplemental data signals 310. Upon receiving a supplemental data signal 310, the signal correlation engine 240 compares the supplemental data signal 310 to the previously-received call data 305 to determine 315 whether the supplemental data signal 310 matches any of the existing answered calls for which the emergency system 150 has received call data 305. The signal correlation engine 240 may compare the supplemental data signal 310 to call data received over a set period of time, e.g., the previous five minutes, and/or to call data for emergency calls that are actively being handled or in queue.

Note that if the call routing service 130 routes an emergency call to a PSAP that does not provide call data to the emergency system 150 (e.g., a PSAP that does not have an EDG device 144), the emergency system 150 does receive call data for that call, and the signal correlation engine 240 does not match the supplemental data signal 310 corresponding to the emergency call to any of the received call data 305. Furthermore, if an emergency call was dropped before being answered, if the caller hung up before the call was answered, or if the emergency call is in a queue at a PSAP, the emergency system 150 may not receive call data for that call, so the signal correlation engine 240 may not match the supplemental data signal 310 corresponding to the emergency call to any of the received call data 305. In some embodiments, the PSAP 140 may provide call data for queued calls that have not yet been answered.

Figure 9:
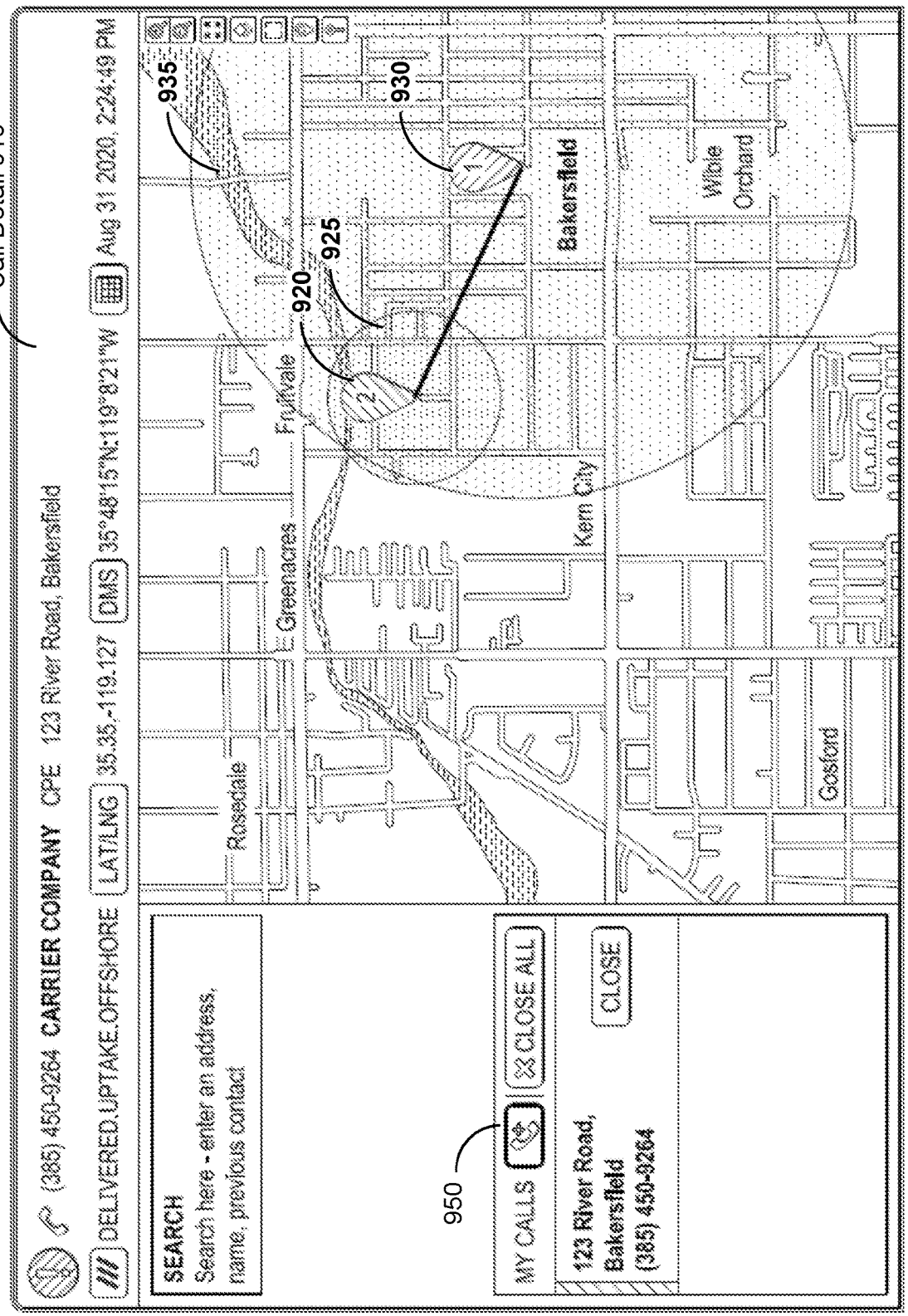
FIG. 9 is a user interface showing caller locations and call data according to some embodiments of the present disclosure.

For a newly received supplemental data signal 310, if the signal correlation engine 240 determines that the supplemental data signal 310 matches a call for which the emergency system 150 has received call data 305, the signal correlation engine 240 associates 320 the supplemental data signal with the call. For example, the emergency system 150 treats a location in the supplemental data signal as a supplemental location of the caller, and the web server 260 changes a visual characteristic of the supplemental signal indicator to indicate that it corresponds to an answered emergency call. An example display of a received call and a supplemental location for the call is shown in FIG. 9. In some embodiments, the web server 260 displays the supplemental location to the telecommunicator handling the call (e.g., the user interface provided to the telecommunicator at the PSAP position indicated in the call data matching the supplemental data signal), and the web server 260 removes the supplemental signal indicator from other telecommunicators' user interfaces.

Figure 5:
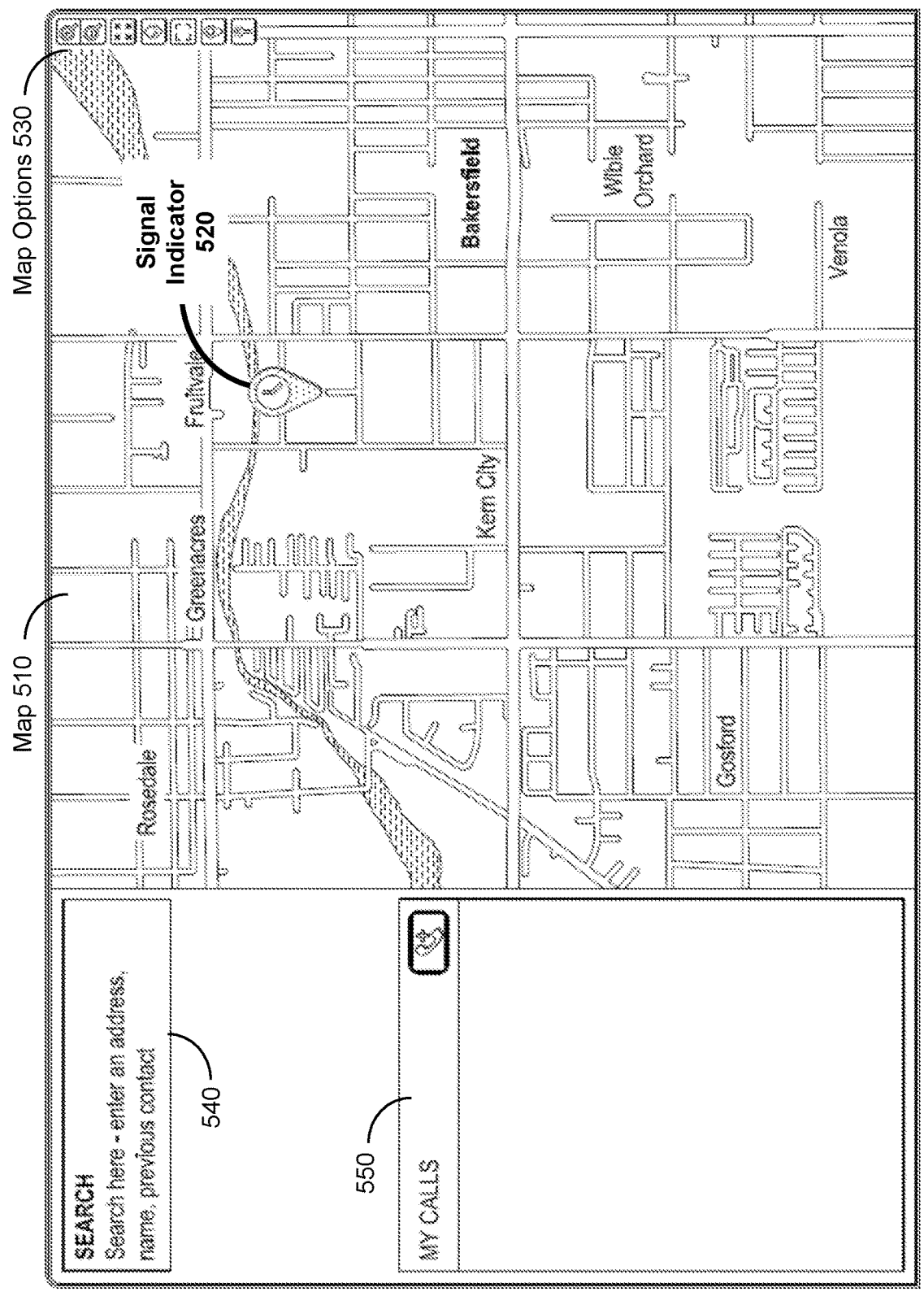
FIG. 5 is a user interface displaying a supplemental signal indicator on a map according to some embodiments of the present disclosure.

If the signal correlation engine 240 determines that received supplemental data signal does not match a call for which the emergency system 150 has received call data 305, the web server 260 displays 325 a supplemental signal indicator in user interfaces at the relevant PSAP or PSAPs, as determined by the tenant mapping module 250. An example of a supplemental signal indicator is shown in FIG. 5. The emergency system 150 (e.g., the web server 260 or another module) compares 330 the time elapsed during which the supplemental data signal 310 was received and not matched to call data 305 to a threshold. The threshold may be 20 seconds, 30 seconds, 1 minute, etc. The threshold may be user-configurable. In some embodiments, the threshold time is compared to a time stamp of the supplemental data signal provided by the supplemental data source (e.g., the time stamp the supplemental data source generated the supplemental data signal) rather than the time that the supplemental data signal 310 was received at the emergency system 150. Meanwhile, the signal correlation engine 240 continues comparing new call data to received signals, e.g., the supplemental data signal 310, and determines whether any new call data matches the supplemental data signal 310, e.g., if the supplemental data signal 310 arrived at the emergency system 150 faster than the call was routed to a PSAP and answered by a telecommunicator.

Figure 6:
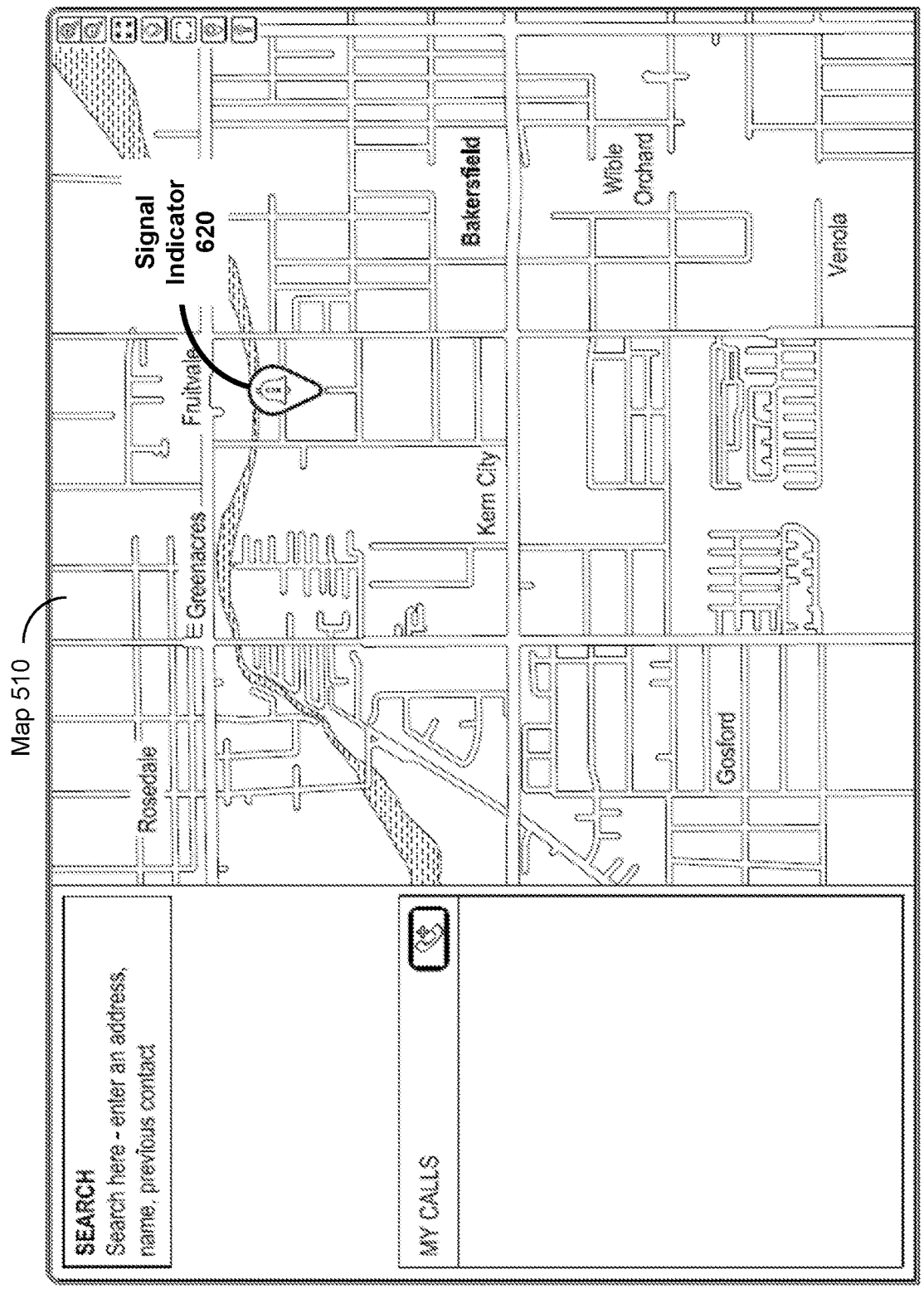
FIG. 6 is a user interface showing the supplemental signal indicator after a threshold amount of time has elapsed according to some embodiments of the present disclosure.

If the threshold amount of time has passed, the web server 260 changes 335 a visual characteristic of the supplemental signal indicator to indicate that the supplemental data signal has been outstanding for the threshold amount of time. The visual change indicates that a call corresponding to the supplemental data signal may have gone unanswered. The supplemental signal indicator may have an appearance indicating an alert to a user, e.g., with a brighter color and alert symbol. An example is shown in FIG. 6.

The signal correlation engine 240 continues to receives call data, in particular, new call data 340, which includes initial call data messages reporting new calls received at one or more PSAPs. The signal correlation engine 240 compares 345 the new call data 340 to the supplemental data signals, including supplemental data signal 310. If any new call data 340 matches the supplemental data signal 310, the signal correlation engine 240 associates 320 the supplemental data signal with the call, as discussed above. Furthermore, the web server 260 no longer displays the supplemental signal indicator as an alert.

The web server 260 also provides one or more selectable options in the user interface for a telecommunicator to respond to an unanswered emergency call, e.g., an option to create an outgoing call to the phone number included in the supplemental data signal 310, an option to create a videochat session with the phone number included in the supplemental data signal 310, and/or an option to create an outgoing text message to the phone number in the supplemental data signal 310. If the emergency system 150 integrates with the CHE 142 and provides call handling functionality, the web server 260 may provide an option for the telecommunicator to answer a call associated with the supplemental data signal that has been received at the telecommunicator's PSAP, e.g., a queued emergency call that has not been answered by a telecommunicator. If the web server 260 receives a selection of an option to call the phone number associated with the supplemental data signal, the web server 260 creates 350 a call, or requests that a call be created (e.g., by on-site call handling equipment), and associates 320 the supplemental data signal with the created call.

FIG. 3 shows a process for handling a newly received supplemental data signal 310. As noted in step 345, the signal correlation engine 240 also matches call data for newly received calls to existing supplemental data signals, e.g., to supplemental data signals received over a set period of time, e.g., the previous five minutes. In particular, upon receiving call data 305 for a call, the signal correlation engine 240 compares the call data 305 to the previously-received supplemental data signals 310 to determine whether the call data 305 matches any of the supplemental data signals 310 received by the emergency system 150. If the signal correlation engine 240 determines that the call data 305 matches a supplemental data signal 310, the signal correlation engine 240 associates 320 the supplemental data signal 310 with the call, and the user interface displays the supplemental data (e.g., the supplemental location) with the call data as shown in FIG. 9. If the signal correlation engine 240 does not match the call data 305 to any supplemental data signals 310, the user interface displays the call data 305 to the telecommunicator handling the call.

Example Call Data and Supplemental Data Signal Mapping

FIG. 4 illustrates the location of call and signals and mapping of calls and signals to particular tenants according to some embodiments of the present disclosure. FIG. 4 illustrates example geofences 405 and 410 of two neighboring PSAPs, one handling emergency calls for County 1 and the other handling emergency calls for County 2. FIG. 4 also illustrates a highway geofence 415 of a highway that extends through the two counties. For example, the highway may be a state highway managed by a state highway patrol. The state highway patrol has one or more state highway PSAPs handling emergency calls for the state highway system.

FIG. 4 shows the locations associated with various signals 420 and calls 425 received at the emergency system 150 in or near County 1 and County 2. FIG. 4 also includes a first table 430 indicating calls and supplemental data signals (also referred to as signals) mapped to County 1 and a second table 435 indicating calls and signals mapped to County 2. The calls are mapped to PSAPs by the call routing service 130, and the signals are mapped to PSAPs by the emergency system 150, e.g., by the tenant mapping module 250.

In this example, the location of call a and the location of signal a both fall within the County 1 geofence 405, and both call a and signal a are mapped to County 1, as shown in the first table 430. Likewise, the location of call c and the location of signal c both fall within the County 2 geofence 410, and both call c and signal c are mapped to County 2, as shown in the second table 435.

The location of call b falls within the County 1 geofence 405, and the location of signal b falls outside the County 1 geofence 405 and within the County 2 geofence 410. In this example, call b has been routed to County 1 based on the call location, as indicated in the first table 430. In this example, the location of call b is an inaccurate cell tower-based location that was provided to the call routing service 130, but the location of the device making call b is actually within County 2, as indicated by the supplemental data signal location. Because County 1 receives call b, the emergency system 150 maps both the call b and the corresponding signal b to County 1. As shown in the second table 435, signal b is also mapped to County 2, and may provide useful contextual information for a telecommunicator responding in County 2.

Figure 10:
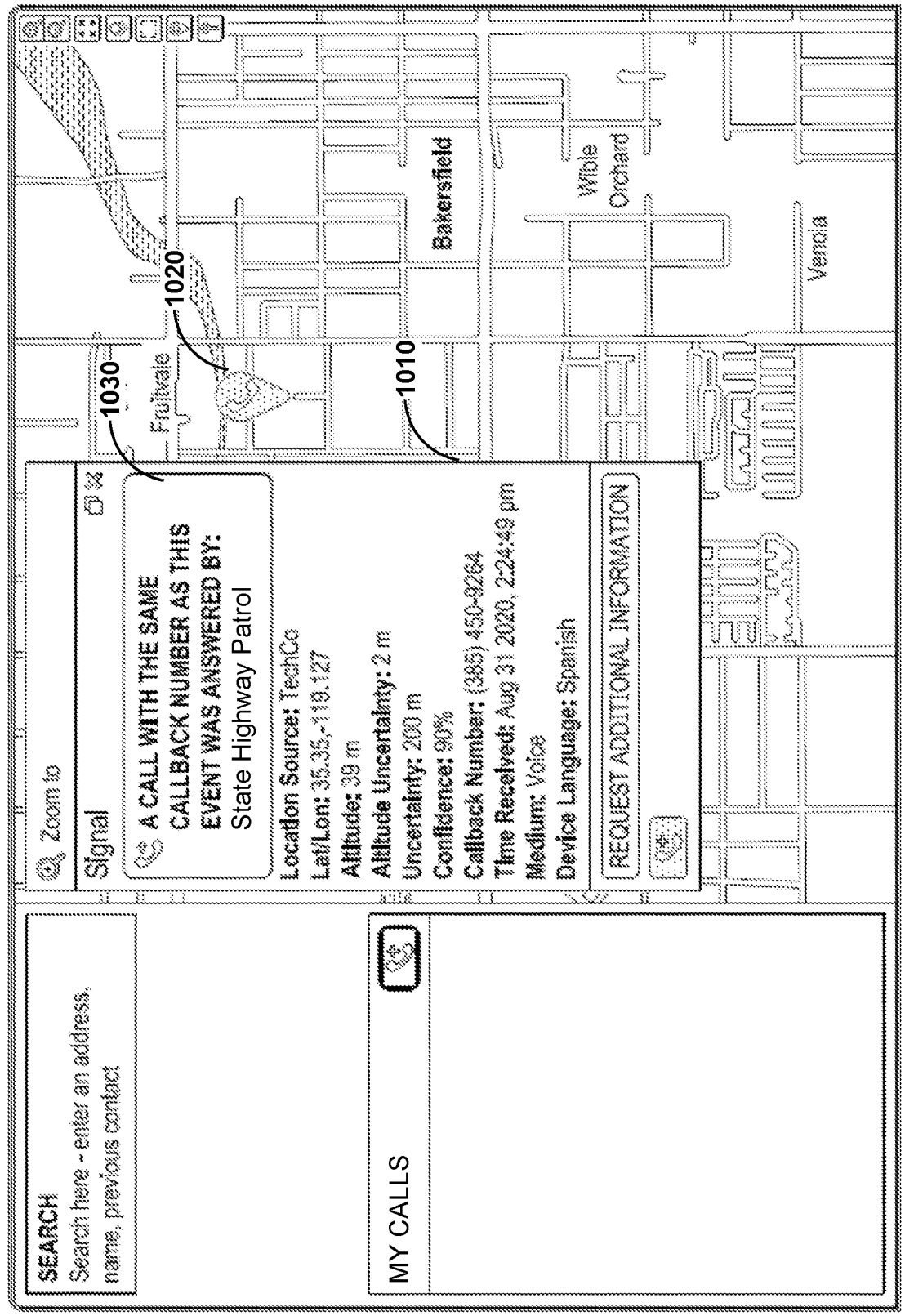
FIG. 10 is a user interface showing a signal detail window corresponding to a call being handled by another PSAP according to some embodiments of the present disclosure.

As one example, if signal b is received as a supplemental data signal before the call data for call b arrives at the emergency system 150, the emergency system 150 maps signal b to County 2 based on the location of signal b falling within the County 2 geofence 410. If the emergency system 150 later receives call data for call b from the County 1 PSAP, the emergency system 150 correlates signals b to call b and maps signal b to County 1. The emergency system 150 may continue mapping signal b to County 2 and display a supplemental signal indicator for signal b in an "all signals" interface. The emergency system 150 show in a user interface provided to a County 2 telecommunicator that call b was answered by County 1; an example of such a notification is shown in FIG. 10. In some cases, a telecommunicator in County 1 may transfer call b to County 2, in which case both call b and signal b are then mapped to County 2.

Signals d, e, and f are associated with calls (not shown in FIG. 4) that were routed to the highway patrol. The locations of signals d and f fall within the highway geofence 415, and the location of signal e falls outside of the highway geofence 415 in County 1. In this example, the call associated with signal e was routed to the highway patrol, e.g., based on an inaccurate initial location. The signals d and e are within the County 1 geofence 405 and mapped to County 1, as shown in the first table 430. The signal f is within the County 2 geofence 410 and mapped to County 2, as shown in the second table 435. If the emergency system 150 receives call data from the highway patrol PSAP (e.g., from an EDG device installed at the highway patrol PSAP), the signal correlation engine 240 associates the signals d, e, and f with the call data from the PSAP. In this embodiment, the emergency system 150 may indicate in the user interfaces provided to telecommunicators in County 1 that calls associated with signals d and e have been answered, e.g., as shown in FIG. 10. Similarly, the emergency system 150 may indicate in the user interfaces provided to telecommunicators in County 2 that the associated with signal f has been answered. Further, if a telecommunicator at one of the county PSAPs (e.g., County 1) sees a supplemental signal indicator for a call (e.g., the call corresponding to signal d) that was routed to the highway patrol but has not been answered (e.g., due to high call volume), the telecommunicator in the county PSAP can request that the call be transferred to the county PSAP, or the telecommunicator may create a call to the emergency caller using the phone number provided in the supplemental signal.

Example User Interfaces

FIG. 5 is a user interface displaying a supplemental signal indicator on a map according to some embodiments of the present disclosure. The user interface includes a map 510 with various streets and place names. A supplemental signal indicator 520 (also referred to as a signal indicator 520) is positioned on the map 510 at the location indicated by a supplemental data signal. The signal indicator 520 may have a particular color or shading indicating that it is a supplemental data signal not presently associated with a received call. In addition, in this example, the signal indicator 520 has a clock icon that indicates that the emergency system 150 is waiting for a corresponding call to arrive, e.g., for a call corresponding to the signal indicator 520 to arrive at the PSAP 140, and for the EDG device 144 in the PSAP 140 to obtain the call data from the CHE 142 and forward the call data to the emergency system 150 for processing.

Figure 7:
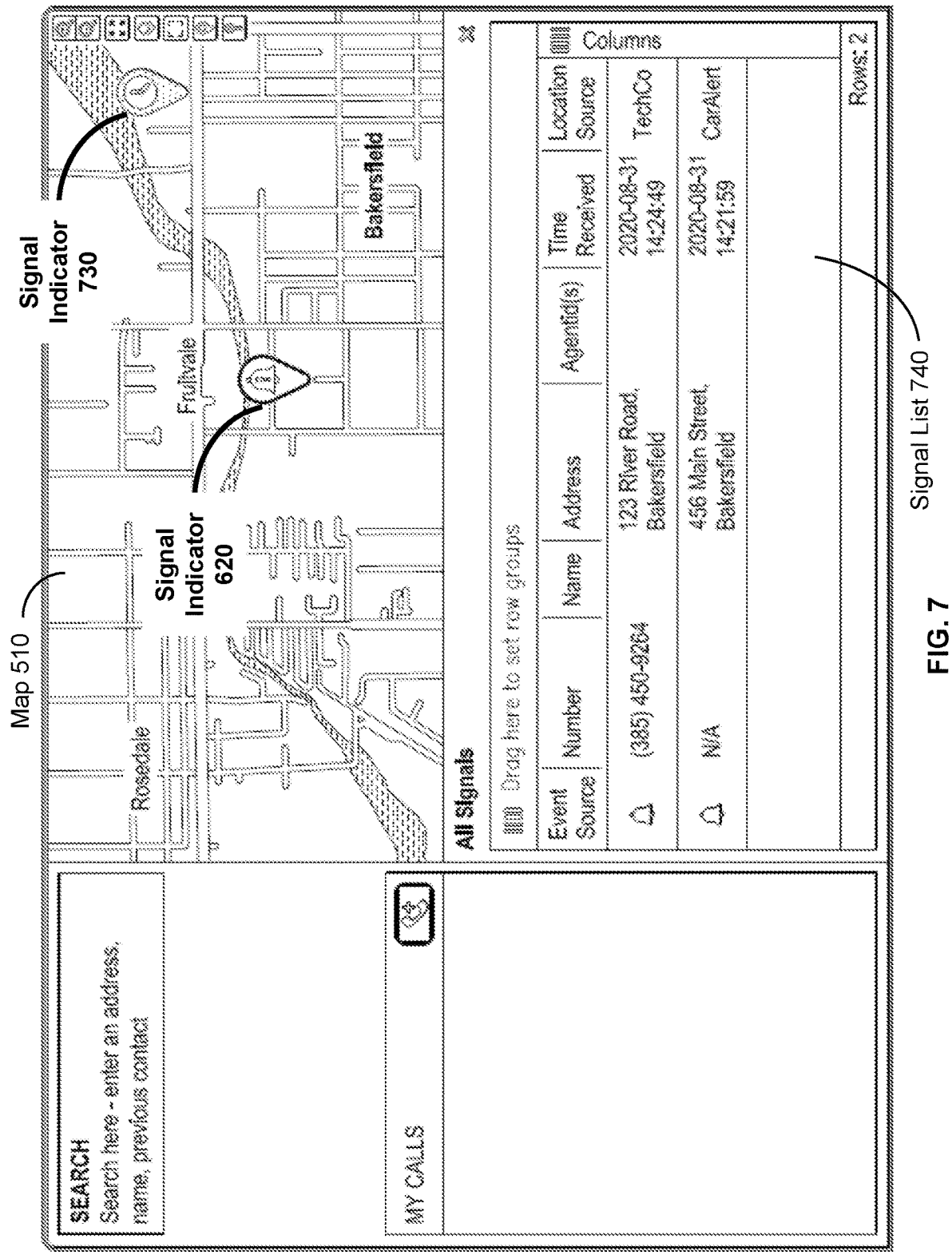
FIG. 7 is a user interface including two signal indicators on the map and a signal list interface according to some embodiments of the present disclosure.

The user interface has additional interface components that may be used by the telecommunicator. In this example, the map incudes a set of map options 530 that can be selected to adjust the display of the map 510, e.g., options to change the zoom level, options to change the region shown, options to change the type of data that is shown on the map 510, etc. One of the options 530 may be an option to view additional details for all signals within a displayed map 510 and/or an option to view additional details for all signals and calls mapped to the PSAP. An example signals list is shown in FIG. 7. The user interface also includes a search bar 540 that can accept search terms from a telecommunicator to search for data related to current or completed calls stored on the emergency system 150. The user interface also includes a list of my calls 550 currently being handled by the telecommunicator; in this case, the calls list 550 is empty, indicating that the telecommunicator is not handling any calls at the moment.

FIG. 6 is a user interface showing the supplemental signal indicator after a threshold amount of time has elapsed according to some embodiments of the present disclosure. The user interface of FIG. 6 includes the map 510 of FIG. 5 and the user interface features described with respect to FIG. 5. FIG. 6 also includes a signal indicator 620, which corresponds to the signal indicator 520 of FIG. 5 but has different visual characteristics indicating that a threshold amount time (e.g., 30 seconds) has elapsed since the supplemental data signal corresponding to the signal indicators 520 and 620 was received or since the supplemental data signal was generated by the supplemental data source. In this example, the clock symbol on the supplemental signal indicator 520 is replaced by an alarm symbol on the supplemental signal indicator 620. In addition, the color of the supplemental signal indicator 620 may have changed, e.g., to be brighter or to stand out more than the color of the supplemental signal indicator 520.

FIG. 7 is a user interface including two signal indicators on the map and a signal list interface according to some embodiments of the present disclosure. The user interface of FIG. 7 includes the map 510 of FIGS. 5 and 6 and the user interface features described with respect to FIG. 5. FIG. 7 includes the signal indicator 620 of FIG. 6, and an additional signal indicator 730. The signal indicator 730 is associated with a different emergency event from the signal indicator 620. FIG. 7 further includes a signal list 740 overlaying a portion of the map 510. The signal list 740 provides details about the signal indicators 620 and 730. A telecommunicator may access the signal list 740 by selecting one of the map options 530, as described with respect to FIG. 5.

The signal list 740 includes fields for the event source of the signals; the phone number, name, and address of the signals; the agent ID of the telecommunicator handling calls associated with the signals; the time the signals were received; and the location source. In this example, both of the signals are supplemental data signals, as indicated here by the alarm symbol. In some embodiments, call data is also included in the signals list 740, with a different event source icon (e.g., a phone icon) indicating the source. In some examples, different types of supplemental data sources (e.g., the vehicle data source 170a, panic button data source 170b, and security system data source 170c) may have different associated icons that can be used in the event source column to indicate the data source.

The web server 260 populates the signals list 740 with information currently available to the emergency system 150. In the example shown in FIG. 7, the supplemental data signals did not include names, so the name fields are blank. In addition, the Agentid(s) fields, which indicate the telecommunicator name and/or position, are blank because the supplemental data signals are not associated with answered calls. If follow-on signals are received (e.g., an updated location from the same mobile device 110), the user interface may display the most recent address and time stamp in the signal list 740. In addition, the user interface may display a single supplemental signal indicator for a series of related supplemental data signals at the most recently received location.

Figure 8:
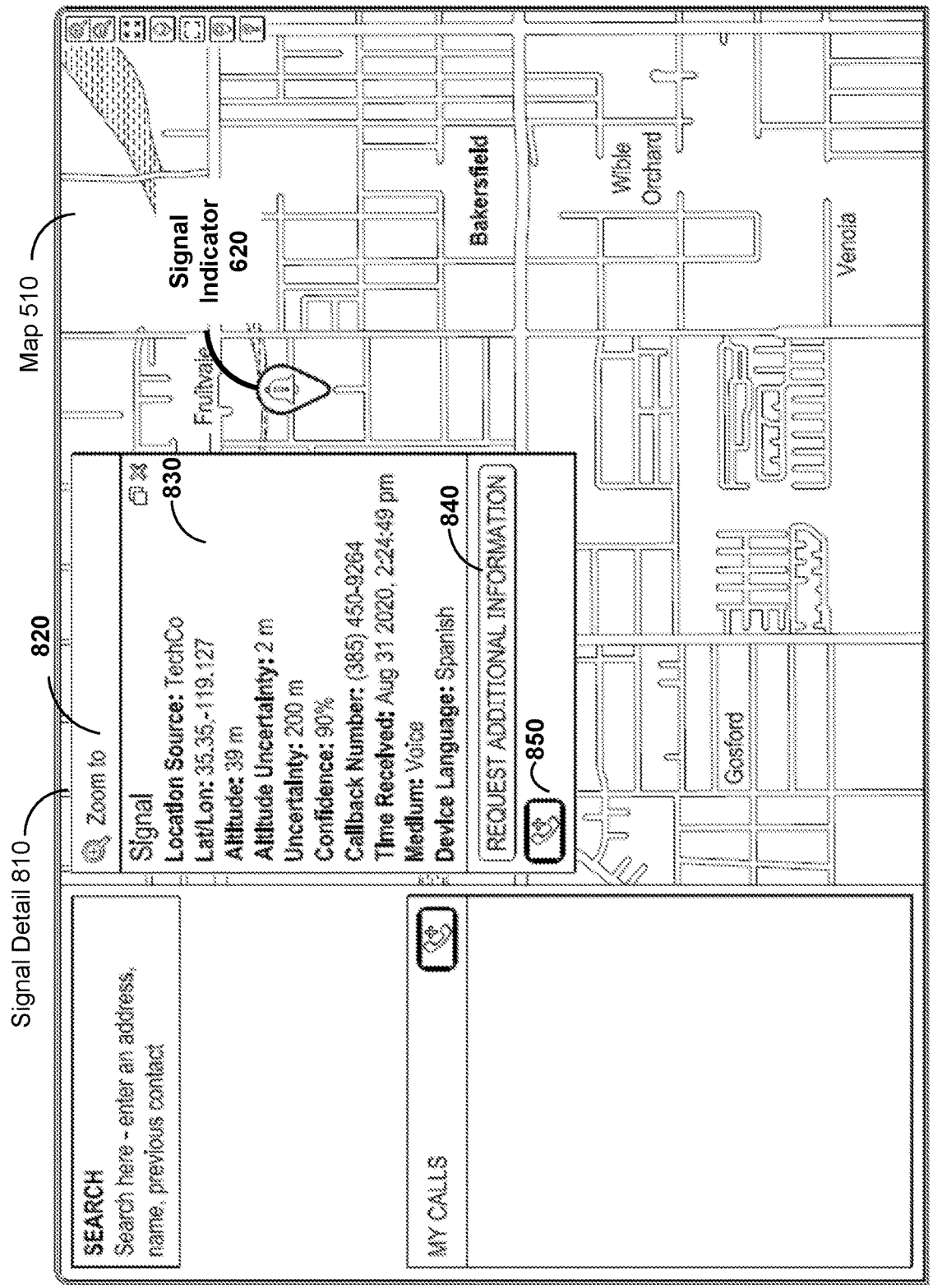
FIG. 8 is a user interface showing a signal detail window according to some embodiments of the present disclosure.

FIG. 8 is a user interface showing a signal detail window according to some embodiments of the present disclosure. The user interface of FIG. 8 includes the map 510 of FIGS. 5-7, the user interface features described with respect to FIG. 5, and the signal indicator 620 shown in FIGS. 6 and 7. If a user selects a signal indicator (here, the signal indicator 620) in the map 510 or a signal on the signal list 740, the user interface provided by the web server 260 provides the signal detail window 810 for the selected signal. In some embodiments, the signal detail window 810 for a signal indicator may appear of the user hovers a cursor over the signal indicator.

The signal detail window 810 includes a zoom option 820. If the telecommunicator selects the zoom option 820, the user interface zooms the map 510 to the signal indicator 620, e.g., to a predefined zoom level. The user interface may also re-center the map so that the signal indicator 620 is visible at the zoom level. The signal detail window 810 further includes a signal data portion 830 that provides information included in or related to the supplemental data signal. In this example, the signal data portion 830 provides the source of the location data (e.g., the name of the mobile device data provider 160 or a name of a secondary data provider 170), the latitude and longitude of the device providing the supplemental data, the altitude of the device, the altitude uncertainty, the location uncertainty, the location confidence, a callback number for the device (e.g., if the device is a mobile phone) or a user associated with the device (e.g., if the device is a security system or a vehicle), a time stamp that the supplemental data signal was received at the emergency system 150, the contact medium used by the device (e.g., voice or text if the device is a mobile phone), and a device language, which may indicate the language spoken by the user of the device/emergency caller. In other embodiments, the signal data portion 830 may include additional or alternative information.

In this example, the signal detail window 810 further includes an option 840 to request additional information. For example, if the mobile device data provider 160 has access to health information and permission to share the health information with emergency responders, the telecommunicator may select the option 840 to request health information from the mobile device data provider 160. As another example, if the signal is received from a security system data source, the telecommunicator may select the option 840 to retrieve a live video stream from the security system.

The signal detail window 810 may also include one or more selectable options enabling a telecommunicator to initiate communication with a device associated with the supplemental data signal. In FIG. 8, the signal detail window 810 includes a create call button 850 that creates an outgoing call to the callback number of the supplemental data signal. In some embodiments, selecting the button 850 may open a call detail screen that provides various options that the telecommunicator may use to initiate communication, e.g., initiate a text message, initiate a video chat, or initiate a call. One or more of the communications options may interface with a third-party communications provider to create the communication session. The telecommunicator may choose to select the create call button 850 if the threshold time has elapsed without a call being received at the PSAP. In some embodiments, instead of or in addition to the create call button 850, the signal detail window 810 includes an SMS button for the telecommunicator to create a texting session with the callback number and/or an answer call button for the telecommunicator to answer a queued call corresponding to the signal.

FIG. 9 is a user interface showing caller locations and call data according to some embodiments of the present disclosure. FIG. 9 shows a user interface after a call associated with the supplemental data signal indicated by the signal indicators 520 and 620 has been answered by a telecommunicator at the PSAP 140, and the call data associated with the call has been transmitted from the PSAP 140 to the emergency system 150. The user interface has converted the signal indicator 520 or 620 to a supplemental call location 920. The supplemental call location 920 is displayed with a surrounding uncertainty radius 925. The user interface also displays a call location 930 received with the call data, and an uncertainty radius 935 for the call location 930. In this example, the uncertainty radius 925 of the supplemental call location 920 is narrower than the uncertainty radius 935 of the call location 930, indicating that the supplemental call location 920 is likely more accurate than the call location 930. The call location 930 may be based on cell tower location or triangulation, while the supplemental call location 920 is a device location. The call location 930 and supplemental call location 920 may be visually distinguished from each other, e.g., using different icons, colors, patterns, shading, etc. The number included in the call location 930 and supplemental call location 920 may indicate the order in which the locations were received, with the most recent location having numbered "1" and older locations subsequently numbered. In this example, the supplemental call location 920 (numbered "2") was received before the call location 930 (numbered "1").

The user interface in FIG. 9 further includes a call detail window 910 providing at least some of the call data and/or data from the supplemental data signal. Here, the call detail window includes a phone number, the carrier company, the data source (CPE), an address, a What3words location encoding, a latitude/longitude, a degrees/minute/seconds (DMS) location, and a time stamp. In addition, the call list 950 now includes the emergency call, which is being handled by the telecommunicator.

FIG. 10 is a user interface showing a signal detail window corresponding to a call being handled by another PSAP according to some embodiments of the present disclosure. This example shows a user interface provided to a telecommunicator at one PSAP (e.g., a county PSAP) after a call associated with the supplemental data signal indicated by the signal indicators 520 and 620 has been answered by a telecommunicator at a another PSAP (e.g., a state highway patrol PSAP), and the call data associated with the call has been transmitted from the other PSAP to the emergency system 150. The signal correlation engine 240 determines that the call data from the state highway patrol PSAP corresponds to the supplemental data signal. For a jurisdiction that the supplemental data signal location falls within (e.g., a county PSAP that the state highway crosses through), the user interface displays the signal indicator 1020 shown in FIG. 10. The signal indicator 1020 corresponds to the signal indicator 520 of FIG. 5 and/or the signal indicator 620 in FIG. 6, but the signal indicator 1020 has different visual characteristics indicating that a call corresponding to the supplemental data signal was answered by another PSAP. In this example, the clock symbol on the supplemental signal indicator 520, or the alarm symbol on the supplemental signal indicator 620, is replaced by a phone symbol. In addition, the color of the supplemental signal indicator 1020 may have changed, e.g., to be duller or grayed out. In some embodiments, the user interface may display the signal indicator 1020 or a similar signal indicator (e.g., a signal indicator with a phone icon and a different color) to a first telecommuter in a PSAP when a second telecommunicator in the same PSAP answers the emergency call corresponding to the signal indicator.

FIG. 10 includes a signal detail window 1010 that is similar to the signal detail window 810 described with respect to FIG. 8. The signal detail window 1010 includes a notification 1030 indicating that the call corresponding to the supplemental signal was answered by another PSAP, in this case, the state highway patrol. If the call was answered by another telecommunicator in the same PSAP, the notification 1030 may indicate the position number and/or name of the telecommunicator who answered the emergency call.

Figure 11:
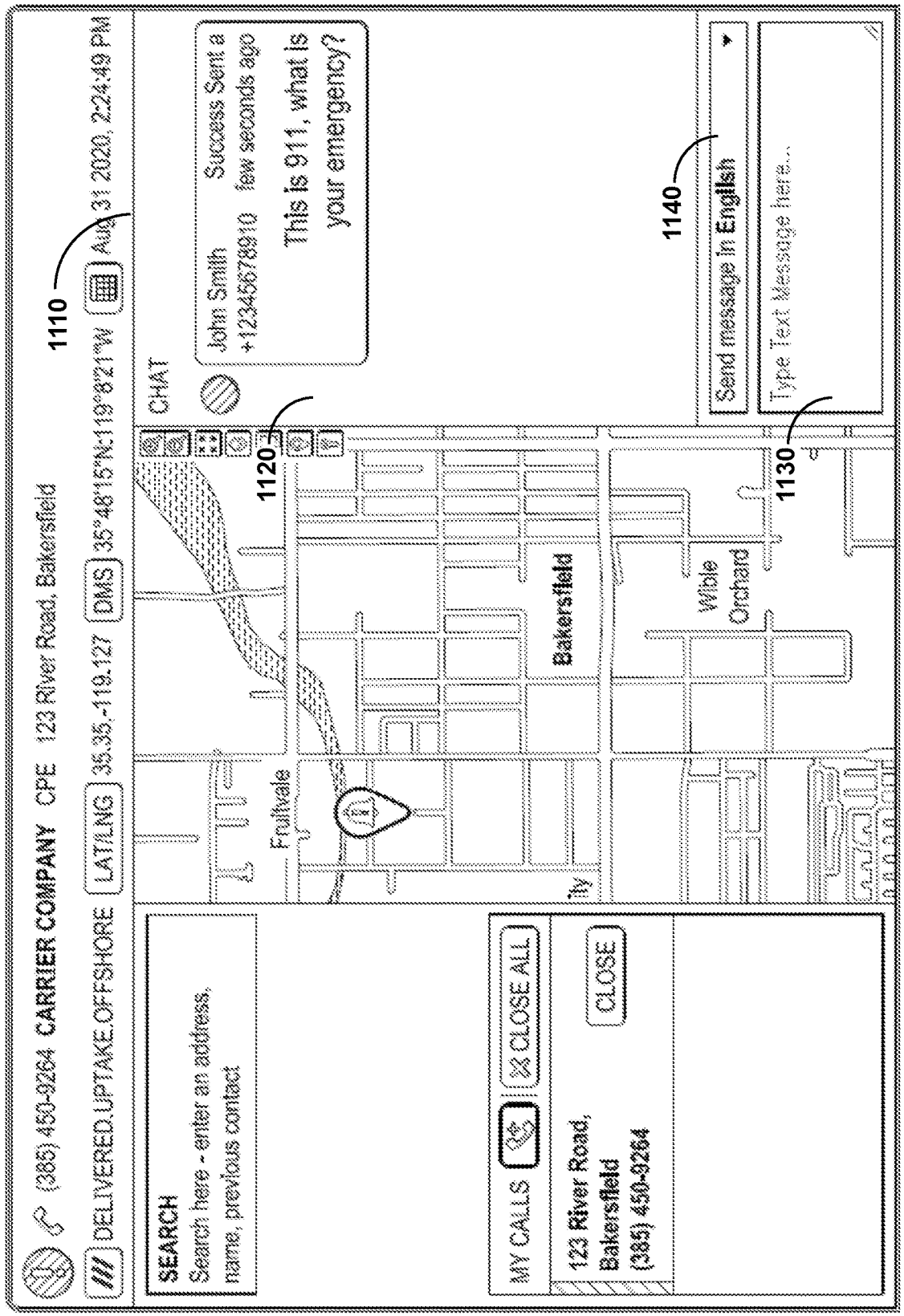
FIG. 11 is a user interface including a text interface for communicating with an emergency caller according to some embodiments of the present disclosure.

FIG. 11 is a user interface including a text interface for communicating with an emergency caller according to some embodiments of the present disclosure. As noted with respect to FIG. 8, in some embodiments, the user interface provides an option to initiate an SMS or text conversation with a callback number provided in a supplemental data signal. FIG. 11 shows an example chat interface 1110 for messaging an emergency caller. The chat interface 1110 includes a chat history portion 1120 for displaying messages sent by the telecommunicator and messages received from the emergency caller and a text entry portion 1130 for the telecommunicator to enter new messages. In this example, the chat interface 1110 includes a language selection menu 1140 with which the telecommunicator may select a message to send messages in. The emergency system 150 may include or use an automatic translation service for automatically translating outbound messages sent by the telecommunicator from a first language (e.g., English, or the telecommunicator's native language in non-English speaking countries) to a second language (e.g., a language indicated in the supplemental data signal). The automatic translation service also translates inbound messages from the second language to the first language.

OTHER IMPLEMENTATION NOTES, VARIATIONS, AND APPLICATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

It should be appreciated that the electrical circuits of the accompanying drawings and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of any of the devices and systems described herein may also be implemented with respect to the methods or processes described herein and specifics in the examples may be used anywhere in one or more embodiments.

What is claimed is:

1. A system for providing locations of emergencies, the system having processing circuitry and memory, the system comprising:
    a call data ingestion module configured to receive call data related to emergency calls received at a plurality of public safety answering points (PSAPs);
    a supplemental data ingestion module configured to receive a supplemental data signal comprising a location of an emergency, the supplemental data signal provided by a supplemental data source separate from a source of the call data;
    a signal correlation engine configured to determine that the supplemental data signal does not correspond to an emergency call received at any of the plurality of PSAPs; and
    a web server configured to provide a user interface comprising a map and a supplemental signal indicator corresponding to the supplemental data signal, the supplemental signal indicator positioned on the map at the location of the emergency, and the supplemental signal indicator having a visual characteristic indicating that the supplemental data signal does not correspond to a received emergency call.

2. The system of claim 1, the signal correlation engine further configured to:
    compare a caller identifier in the supplemental data signal to corresponding caller identifiers in the call data related to the emergency calls received at the plurality of PSAPs; and
    in response to the caller identifier in the supplemental data signal not matching the corresponding caller identifiers in the call data related to the emergency calls received at the plurality of PSAPs, determining that the supplemental data signal does not correspond to a received emergency call.

3. The system of claim 2, the call data ingestion module further configured to receive additional call data matching the caller identifier in the supplemental data signal, and the web server further configured to modify the visual characteristic of the supplemental signal indicator to indicate that the supplemental data signal corresponds to a received emergency call.

4. The system of claim 1, the web server further configured to:
    compare an amount of time since the supplemental data signal was received to a threshold amount of time; and
    in response to determining that the threshold amount of time has elapsed since the supplemental data signal was received, modify the visual characteristic of the supplemental signal indicator.

5. The system of claim 1, the web server further configured to provide, in the user interface, a selectable option to initiate communication with a device associated with the supplemental data signal.

6. The system of claim 1, wherein the supplemental data signal is a first supplemental data signal, and the supplemental data ingestion module is configured to:
receive a second supplemental data signal;
determine that the second supplemental data signal is related to the first supplemental data signal; and
associate the second supplemental data signal with the first supplemental data signal.

7. The system of claim 1, wherein the user interface is associated with a first PSAP of the plurality of PSAPs, and the system further comprises a tenant mapping module configured to:
compare the location of the emergency to geographic data describing a geographic region handled by the first PSAP; and
map the supplemental data signal to the first PSAP in response to the location of the emergency falling within the geographic region handled by the first PSAP,
wherein the web server is configured to include, in the user interface, supplemental signal indicators corresponding to supplemental data signals mapped to the first PSAP by the tenant mapping module.

8. The system of claim 1, wherein the call data ingestion module receives the call data for a first PSAP of the plurality of PSAPs from the first PSAP, and the supplemental data source is located outside the first PSAP.

9. The system of claim 1, wherein the supplemental data signal corresponds to a dropped call, an unanswered call, or a hung-up call.

10. The system of claim 1, wherein the supplemental data signal is a data signal that is not generated in response to a person dialing an emergency number.

11. A method for providing a location of an emergency caller comprising:
receiving call data related to emergency calls received at a plurality of public safety answering points (PSAPs);
receiving a supplemental data signal comprising a location of an emergency, the supplemental data signal provided by a supplemental data source separate from a source of the call data;
determining that the supplemental data signal does not correspond to an emergency call received at any of the plurality of PSAPs; and
providing a user interface comprising a map and a supplemental signal indicator corresponding to the supplemental data signal, the supplemental signal indicator positioned on the map at the location of the emergency, and the supplemental signal indicator having a visual characteristic indicating that the supplemental data signal does not correspond to a received emergency call.

12. The method of claim 11, wherein determining that the supplemental data signal does not corresponds to an emergency call comprises:
comparing a caller identifier in the supplemental data signal to corresponding caller identifiers in the call data related to the emergency calls received at the plurality of PSAPs; and
in response to the caller identifier in the supplemental data signal not matching the corresponding caller identifier in the call data related to the emergency calls received at the plurality of PSAPs, determining that the supplemental data signal does not correspond to a received emergency call.

13. The method of claim 12, further comprising:
receiving additional call data matching the caller identifier in the supplemental data signal; and
modifying the visual characteristic of the supplemental signal indicator to indicate that the supplemental data signal corresponds to a received emergency call.

14. The method of claim 11, further comprising:
comparing an amount of time since the supplemental data signal was received to a threshold amount of time; and
in response to determining that the threshold amount of time has elapsed since the supplemental data signal was received, modifying the visual characteristic of the supplemental signal indicator.

15. The method of claim 11, further comprising providing, in the user interface, a selectable option to initiate communication with a device associated with the supplemental data signal.

16. The method of claim 11, wherein the supplemental data signal is a first supplemental data signal, the method further comprising:
receiving a second supplemental data signal;
determining that the second supplemental data signal is related to the first supplemental data signal; and
associating the second supplemental data signal with the first supplemental data signal.

17. The method of claim 11, wherein the user interface is associated with a first PSAP of the plurality of PSAPs, the method further comprising:
comparing the location of the emergency to geographic data describing a geographic region handled by the first PSAP; and
mapping the supplemental data signal to the first PSAP in response to the location of the emergency falling within the geographic region handled by the first PSAP,
wherein the user interface includes supplemental signal indicators corresponding to supplemental data signals mapped to the first PSAP.

18. The method of claim 11, wherein the call data for calls received at a first PSAP is received from the first PSAP, and the supplemental data signal is received from a supplemental data source outside the first PSAP.

19. The method of claim 11, wherein the supplemental data signal corresponds to a dropped call, an unanswered call, or a hung-up call.

20. The method of claim 11, wherein the supplemental data signal is a data signal that is not generated in response to a person dialing an emergency number.

* * * * *